Feb. 3, 1942.          A. J. MAGNAN                2,271,699
                     VEHICLE COUPLING
                   Filed April 25, 1940
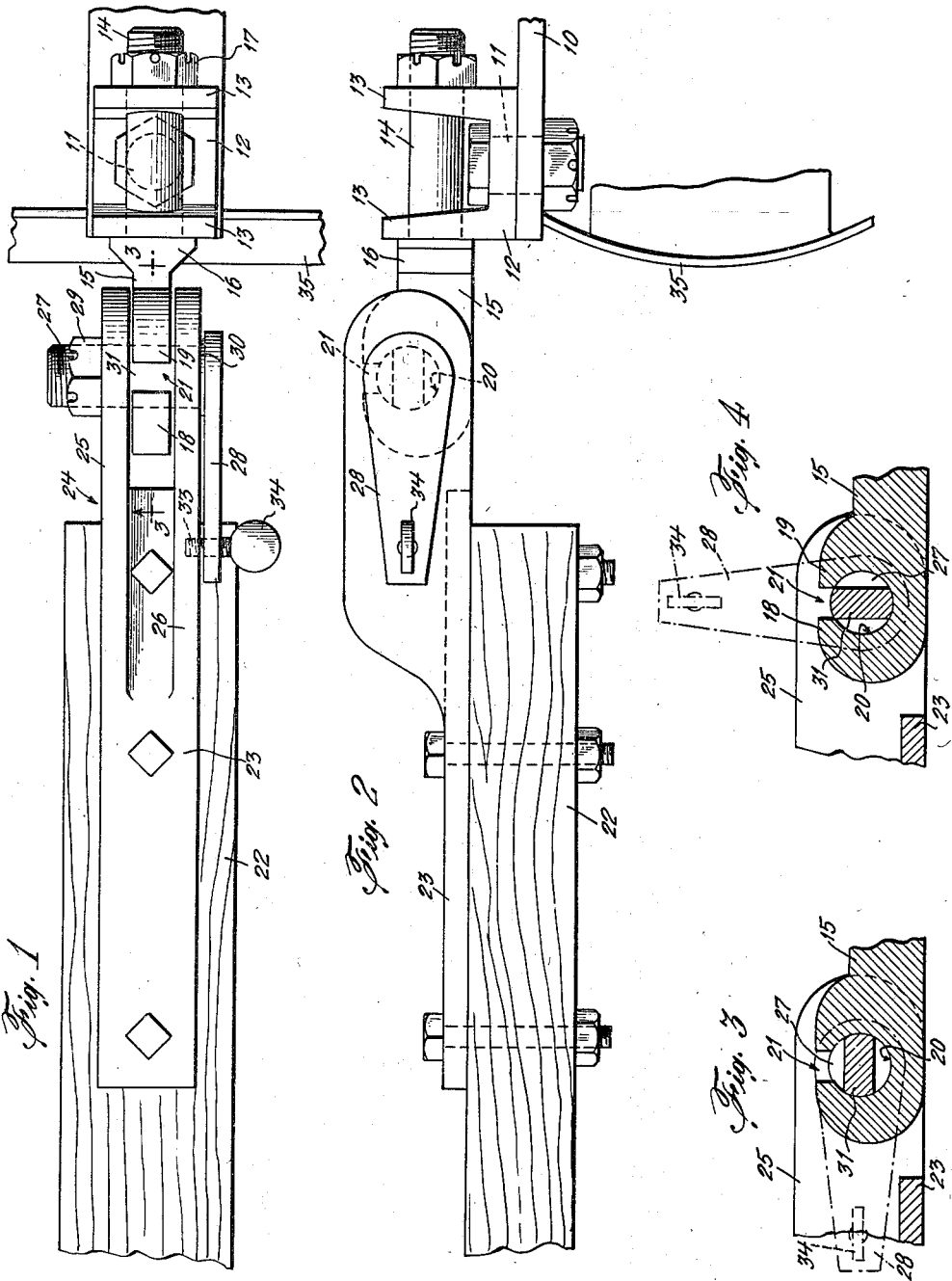
INVENTOR.
ARTHUR J. MAGNAN
BY
   J. Ledermann
            ATTORNEY

UNITED STATES PATENT OFFICE 2,271,699

VEHICLE COUPLING

Arthur J. Magnan, Brainerd, Minn.

Application April 25, 1940, Serial No. 331,551

1 Claim. (Cl. 280—33.15)

This invention relates generally to connectors, couplings or hitches, and more particularly to trailer hitches whereby a trailed vehicle may be hitched to a propelling vehicle, such as an automobile.

One object of the invention is the provision of a hitch which is sturdy in construction, simple in operation, and at the same time provides a secure and safe coupling between the motor vehicle and the trailer which cannot be loosened or uncoupled by vibration, swaying or through the impact of road bumps.

The above and other objects will become apparent in the description below, in which characters of reference refer to like-named parts in the accompanying drawing.

Referring briefly to the drawing,

Figure 1 is a plan view of the hitch.

Figure 2 is a side elevational view of the same.

Figure 3 is a cross-sectional view taken on the line 3—3 of Figure 1, showing the locking lever in open position.

Figure 4 is a view similar to Figure 3, but showing the locking lever in closed position.

Referring in detail to the drawing, the numeral 10 indicates a part of the frame of the automotive vehicle, not shown, or an extension secured to said frame. A vertical pivot bolt 11 extends through the frame 10 and through a pivot block 12, securing the latter pivotally on the frame 10. A pair of spaced ears 13 extend upward from the base of the block 12, and are provided with aligned horizontal openings therethrough, through which the shank 14, on the end of a tongue 15, extends. The free end of the shank 14 is threaded, and the shank is firmly secured in place in the block 12 between the rigid collar 16 on the tongue and the lock nut 17 screwed on the threaded end of the shank.

A pair of jaws 18 and 19 are formed on the end of the tongue 15, having a circular opening 20 enclosed thereby, and having a slot 21 positioned at the top between the jaws to serve as an entrance into the opening 20.

The trailer tongue is shown fragmentarily at 22, and has a plate 23 secured to the upper surface thereof. A yoke 24, having the arms 25 and 26, extends outward and upward from the plate 23, and near their ends these arms are provided with horizontally aligned openings through which a locking bolt 27 passes pivotally. The same bolt 27 passes through the opening 20 between the tongue jaws 18—19, and thereby the motor vehicle tongue 15 is coupled to the trailer tongue 22. On one end of the locking bolt 27 a locking lever 28 is rigidly secured thereto and lies closely adjacent the outer surface of the yoke tongue 26. The other end of the bolt 27 is threaded, and the coupling is secured by a lock unit nut 29 on that end. A spacer collar 30 is provided on the bolt 27 adjacent the lever so as to space the latter from the outer surface of the yoke arm 26. Intermediate its length, the bolt 27 is slotted on both opposed sides to provide a lug 31 having its opposed faces, i. e., the bases of the slots formed by the above-mentioned slotting, mutually parallel, and of a thickness, i. e., the distance between the said opposed faces of the lug, approximately equal to the width of the slot 21 between the jaws 18 and 19 of the tongue 15. The length of the lug 31 is approximately equal to the distance between the inner surfaces of the yoke arms 25 and 26. It is apparent, that with the lever 28 in the position shown in Figures 1, 2, and 3, the lug 31 will lie transversely of the slot 21, as shown, and hence it will be impossible for the lug to rise out through the slot 21, which means, that it will be impossible for the trailer tongue to become uncoupled from the motor vehicle tongue. By rotating the lever 28 clockwise through an arc of 90 degrees into the position shown in Figure 4, however, the lug 31 will become aligned with the slot 21 so that the yoke 24 will become disengaged from the tongue 15 to permit raising of the yoke (and with it, the bolt 27) out of the jaws 18 and 19 of the tongue 15, to uncouple the two vehicles.

A threaded hole 33 is provided in the side of the arm 26, and a wing screw 34 is provided in the end of the lever 28. When the latter is in locking position, as shown in Figures 1, 2, and 3, the screw 34 is screwed into the hole 33 to prevent inadvertent swinging of the lever from the locked position into, or toward, the open position. The rear bumper of the motor vehicle is shown at 35, and is shown merely for the purpose of orientation of the hitch.

The coupling illustrated and above described may of course be constructed without adhering to all the details set forth, or with changing them, and it may also be applied and operated in modified ways. Applicant therefore does not wish to limit the invention specifically to the device shown and described, since obvious modifications in form and structure may be made without departing from the spirit and scope of the invention.

I claim:

A device of the class described adapted to couple two vehicles, comprising a pair of tongues extending from the vehicles, one of said tongues having a pair of horizontally spaced yoke arms mounted on the top thereof and extending therefrom, the other of said tongues having a pair of jaws formed thereon, said jaws having a circular opening formed therebetween, said yoke arms having aligned horizontal circular openings formed therein, adapted to be aligned with said first opening, a bolt passing pivotally through said aligned yoke and jaw openings to couple said tongues together, said jaws having an entrance slot therebetween, said bolt having a flattened reduced lug formed intermediate its length of approximately the same thickness as the width of said slot, said lug when said bolt is in one position being adapted to pass through said slot and when in a position at right angles thereto lying transversely to said slot to lock said tongues together, and means for rotating said bolt, one end of said bolt being secured to said rotating means, the other end of said bolt being threaded and having a lock nut thereon, and a spacer collar on said bolt between said rotating means and said yoke.

ARTHUR J. MAGNAN.